US011803848B1

(12) United States Patent
Gupta et al.

(10) Patent No.: US 11,803,848 B1
(45) Date of Patent: Oct. 31, 2023

(54) EVENT-DRIVEN DISTRIBUTED NETWORKED JACKPOT ARCHITECTURE

(71) Applicant: PointsBet Pty Ltd., Cremorne (AU)

(72) Inventors: Sudhir Gupta, Saratoga, CA (US); Manjit Gombra Singh, Saratoga, CA (US)

(73) Assignee: PointsBet Pty Ltd., Cremorne (AU)

( * ) Notice: Subject to any disclaimer, the term of this patent is extended or adjusted under 35 U.S.C. 154(b) by 0 days.

(21) Appl. No.: 17/845,672

(22) Filed: Jun. 21, 2022

(51) Int. Cl.
*G07F 17/00* (2006.01)
*G06Q 20/38* (2012.01)
*G07F 17/32* (2006.01)

(52) U.S. Cl.
CPC ....... *G06Q 20/389* (2013.01); *G07F 17/3223* (2013.01); *G07F 17/3237* (2013.01); *G07F 17/3258* (2013.01)

(58) Field of Classification Search
None
See application file for complete search history.

(56) References Cited

U.S. PATENT DOCUMENTS

| | | | | |
|---|---|---|---|---|
| 6,464,582 B1 * | 10/2002 | Baerlocher | ......... | G07F 17/3262 463/20 |
| 7,682,248 B2 * | 3/2010 | Baerlocher | ............. | G07F 17/32 463/16 |
| 7,771,271 B2 * | 8/2010 | Walker | ................ | G07F 17/3234 463/31 |
| 8,025,561 B2 * | 9/2011 | Reddicks | ................ | G07F 17/32 463/19 |
| 8,272,959 B2 * | 9/2012 | Yacenda | ................ | A63F 3/081 463/16 |
| 9,202,337 B2 * | 12/2015 | Lee | ..................... | G07F 17/3258 |
| 9,286,765 B2 * | 3/2016 | Saunders | ............ | G07F 17/3227 |
| 9,443,390 B2 * | 9/2016 | LeMay | ............... | G07F 17/3248 |
| 9,799,160 B2 | 10/2017 | Walker et al. | | |
| 9,852,582 B2 * | 12/2017 | Colvin | ............... | G07F 17/3244 |
| 11,158,164 B2 | 10/2021 | Simons | | |
| 11,636,520 B1 * | 4/2023 | Olden | ................... | G06Q 20/065 705/14.69 |
| 2002/0137562 A1 * | 9/2002 | Malone | ............... | G07F 17/3286 463/19 |
| 2005/0261058 A1 * | 11/2005 | Nguyen | ............. | G07F 17/3255 463/40 |

(Continued)

FOREIGN PATENT DOCUMENTS

| | | |
|---|---|---|
| AU | 2006216910 B2 | 8/2006 |
| AU | 2012230088 | 4/2013 |
| AU | 2018271271 | 7/2019 |

*Primary Examiner* — Paul A D'Agostino
(74) *Attorney, Agent, or Firm* — HANLEY, FLIGHT & ZIMMERMAN, LLC

(57) ABSTRACT

Methods, apparatus, systems, and articles of manufacture are disclosed in relation to an event-driven distributed networked jackpot architecture. An example apparatus includes a transaction aggregator to monitor transactions with respect to a user device and a transaction engine regarding content provided to the user device; and transaction services to process the transactions from the transaction aggregator to at least: determine occurrence of an event with respect to the user device based on an evaluation of the transactions; when the event is determined to occur, trigger a notification of the event to the user device; and update a record based on the processing of the transactions.

18 Claims, 14 Drawing Sheets

(56) References Cited

U.S. PATENT DOCUMENTS

| | | | |
|---|---|---|---|
| 2006/0148551 A1* | 7/2006 | Walker | G07F 17/3227 463/16 |
| 2006/0148567 A1* | 7/2006 | Kellerman | G07F 17/3255 463/42 |
| 2006/0211493 A1* | 9/2006 | Walker | G07F 17/3262 463/29 |
| 2006/0258422 A1* | 11/2006 | Walker | G07F 17/32 463/7 |
| 2007/0060355 A1* | 3/2007 | Amaitis | G06Q 20/3224 463/40 |
| 2007/0072667 A1* | 3/2007 | Limacher | G07F 17/3223 463/16 |
| 2008/0176618 A1* | 7/2008 | Toompere | G07F 17/3223 463/16 |
| 2009/0075715 A1* | 3/2009 | Coleman | G07F 17/3209 463/19 |
| 2009/0137304 A1* | 5/2009 | Yacenda | G07F 17/3237 463/17 |
| 2009/0197664 A1* | 8/2009 | Schultz | G07F 17/32 463/18 |
| 2010/0035679 A1* | 2/2010 | Oram | G07F 17/3232 463/25 |
| 2010/0124983 A1* | 5/2010 | Gowin | G07F 17/3223 463/40 |
| 2010/0192212 A1* | 7/2010 | Raleigh | H04W 8/20 726/7 |
| 2010/0240455 A1* | 9/2010 | Gagner | G07F 17/3227 463/30 |
| 2011/0207529 A1* | 8/2011 | Acres | G07F 17/3244 463/43 |
| 2011/0244949 A1* | 10/2011 | Gagner | G07F 17/32 463/25 |
| 2011/0300917 A1* | 12/2011 | Hill | G07F 17/32 463/11 |
| 2012/0165088 A1* | 6/2012 | Martinez-Ortega | G07F 17/329 463/17 |
| 2013/0040730 A1* | 2/2013 | Barclay | G07F 17/3225 463/25 |
| 2013/0166438 A1* | 6/2013 | Theado | G06Q 40/03 707/662 |
| 2013/0225298 A1* | 8/2013 | Hamlin | G06Q 10/10 463/42 |
| 2013/0275169 A1* | 10/2013 | Acres | G06Q 10/06 705/7.14 |
| 2014/0080590 A1* | 3/2014 | Link | G07F 17/3255 463/25 |
| 2014/0173149 A1* | 6/2014 | Walker | G06F 13/4221 710/263 |
| 2014/0198687 A1* | 7/2014 | Raleigh | H04L 12/1475 370/328 |
| 2017/0006141 A1* | 1/2017 | Bhadra | H04W 4/70 |
| 2019/0261203 A1* | 8/2019 | Raleigh | H04W 24/08 |
| 2019/0311430 A1* | 10/2019 | Raleigh | G06Q 40/03 |
| 2020/0374356 A1* | 11/2020 | Bejar | G06F 40/30 |
| 2020/0410018 A1* | 12/2020 | Gao | G06F 16/9535 |
| 2023/0004894 A1* | 1/2023 | Fiumara | G06N 5/04 |
| 2023/0004895 A1* | 1/2023 | Hartwig | G06Q 10/0637 |
| 2023/0005334 A1* | 1/2023 | Fiumara | G07F 17/3223 |

* cited by examiner

US 11,803,848 B1

EVENT-DRIVEN DISTRIBUTED NETWORKED JACKPOT ARCHITECTURE

FIELD OF THE DISCLOSURE

This disclosure relates generally to an event-driven distributed network architecture, and, more particularly, to an event-driven distributed networked jackpot architecture and associated methods.

BACKGROUND

Distributed network computing is a highly complex field of technology and, accordingly, a great deal of research that is undertaken in computer science and data science has been dedicated to a broad range of topics related to managing and controlling distributed network computing. However, managing content across a distributed network remains a challenging and uncertain area.

For example, different computing systems may have different protocols, different constraints, and different technologies that may or may not be compatible with others. Certain locations may have certain restrictions regarding functionality and interoperability. It has been impractical for a single entity to control and/or provide different forms of content and monitor different results across disparate, distributed systems. As such, there is a need for improved, event-driven distributed network architectures and associated methods of use.

Figure 1:
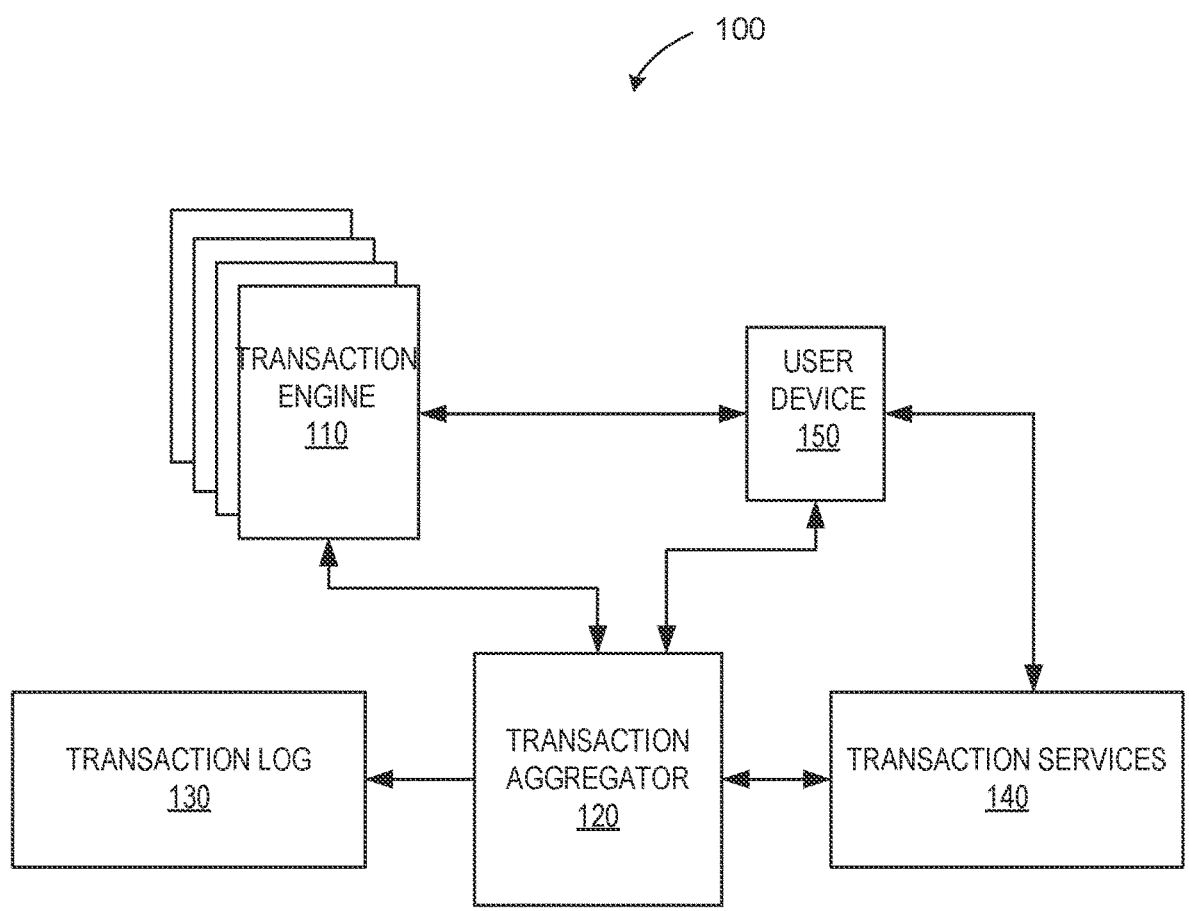
FIG. 1 illustrates an example event-driven distributed network architecture.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

A remote server (e.g., a remote gaming server (RGS), etc.) can provide content to one or more terminals (e.g., a smart phone, tablet, laptop, desktop computer, electronic gaming machine, kiosk, etc.) for game play. For example, the remote server can provide one or more games from a library to distributed gaming terminals. However, in some examples, a remote server is only able to communicate with a certain subset of distributed gaming terminals (and vice versa) due to proprietary content, proprietary protocol, licensing restriction, etc. As such, different technologies, different control, and/or different data/content ownership can create a confusing, dysfunctional network that does not operate correctly or function for its intended purpose of providing a variety of content from a source machine to a plurality of disparate devices.

In certain examples, a remote gaming server can provide certain content to a particular subset of gaming devices to drive outcomes at those receiving devices. However, the remote gaming server may be limited in its content and in the subset of devices with which it can communicate and drive outcomes. Additionally, a remote gaming server may be siloed based on location, provider, technology, service, control, data ownership, etc. Such isolation of remote gaming server separates devices and functionality and limits capabilities of such networks.

Instead, certain examples provide an event-driven distributed network architecture that enables content and functionality, such as a jackpot, etc., to be provided as a service across networks, across devices, across technologies and/or formats, etc. Certain examples enable coordinated and/or separated jackpots as a service for one or more systems in communication with the architecture or framework. Certain examples provide an aggregator or layer to enable provisioning of the jackpot-as-a-service across multiple systems.

FIG. 1 illustrates an example event-driven distributed network architecture 100. The example architecture 100 includes one or more transaction engines 110, a transaction aggregator 120, a transaction log 130, and transaction services 140 in communication with one or more user devices 150. As shown in the example of FIG. 1, a trigger at one or more of the transaction engine 110, the user device 150, the transaction services 140, etc., causes the transaction services 140 to engage with the user device 150 and the transaction aggregator 120 (and one or more transaction engines 110 via the transaction aggregator 120). For example, the user device 150 interacts with the transaction engine 110, and the transaction engine 110 provides a transaction/result to the transaction aggregator 120. The transaction aggregator 120 records a record or entry related to the transaction with the transaction engine 110 in the transaction log 130 and triggers the transaction services 140 to provide an output to the user device 150.

As shown in the example of FIG. 1, the transaction aggregator 120 ties together a plurality of transaction engines 110 and user devices 150 with the transaction log 130 and the transaction services 140. The transaction aggregator 120 enables the transaction services 140 to provide a plurality of services to one or more user devices 150 and/or transaction engines 110, alone or in conjunction with one or more transaction engines 110, for example. In certain examples, the transaction services 140 can provide one service to one transaction engine 110 and another service to another transaction engine 110, etc., in conjunction with the transaction aggregator 120.

For example, the transaction aggregator 120 can implement a casino management layer (CML) allowing the transaction services 140 to implement a jackpot service for one or more transaction engines 110, which implement remote gaming server(s) (RGS). In certain examples, the transaction services 140 can provide a first jackpot service to a first RGS transaction engine 110 and a second jackpot service to a second RGS transaction engine 110. In certain examples, each RGS transaction engine 110 runs a random number generator (RNG) and drives game outcomes, etc., with the jackpot transaction services 140 providing a jackpot service to one or more of the RGS transaction engines 110. The CML transaction aggregator 120 aggregates transactions (e.g., wagers, etc.) from a plurality of RGS transaction engines 110 and can be leveraged by the transaction services 140 to run a common service (e.g., a jackpot service) across the separate RGS transaction engines 110, for example. The transaction log 130 can provide player account management (e.g., a player wallet, etc.) to manage transactions involving a player account (e.g., deducting wagers from the account (e.g., sportsbook wagers, roulette, slots, etc.), adding winnings to the account, etc.).

In operation, the user device 150 loads content (e.g., a game, etc.) from a transaction engine 110 and interacts with the transaction engine 110 to determine an output/outcome (e.g., play the game, etc.), for example. The transaction engine 110 reports interaction with the user device 150 to the transaction aggregator 120. The transaction aggregator 120 updates the transaction log 130 based on the interaction (e.g., updates a player account and associated wallet based on losing/winning, etc.).

In certain examples, the transaction aggregator 120 publishes notifications such as events, actions, etc., and the transaction services 140 subscribes and/or otherwise receives the notifications from the transaction aggregator 120. The transaction aggregator 120 can customize/filter notifications based on one or more criterion/parameter/setting, for example (e.g., notify of wagers placed on a game, winning/losing events, etc.). The transaction services 140 can maintain one or more meters based at least in part on notifications from the transaction aggregator 120. Based on meter value(s), other events, etc., the transaction services 140 can determine to trigger an outcome for the user device 150. For example, jackpot transaction services 140 can determine, based on meter values, to award a jackpot to the user device 150. A jackpot notification is pushed to the user device 150 and an associated player account is updated in the transaction log 130, for example. When no win occurs, one or more meters can be updated. As such, jackpot services provided by the transaction services 140 can be turnover and/or other event driven, for example. In certain examples, the service provided by the transaction services 140 is location-limited (e.g., only available to the user device 150 in a certain geographic location, certain environment, etc.).

Figure 2:
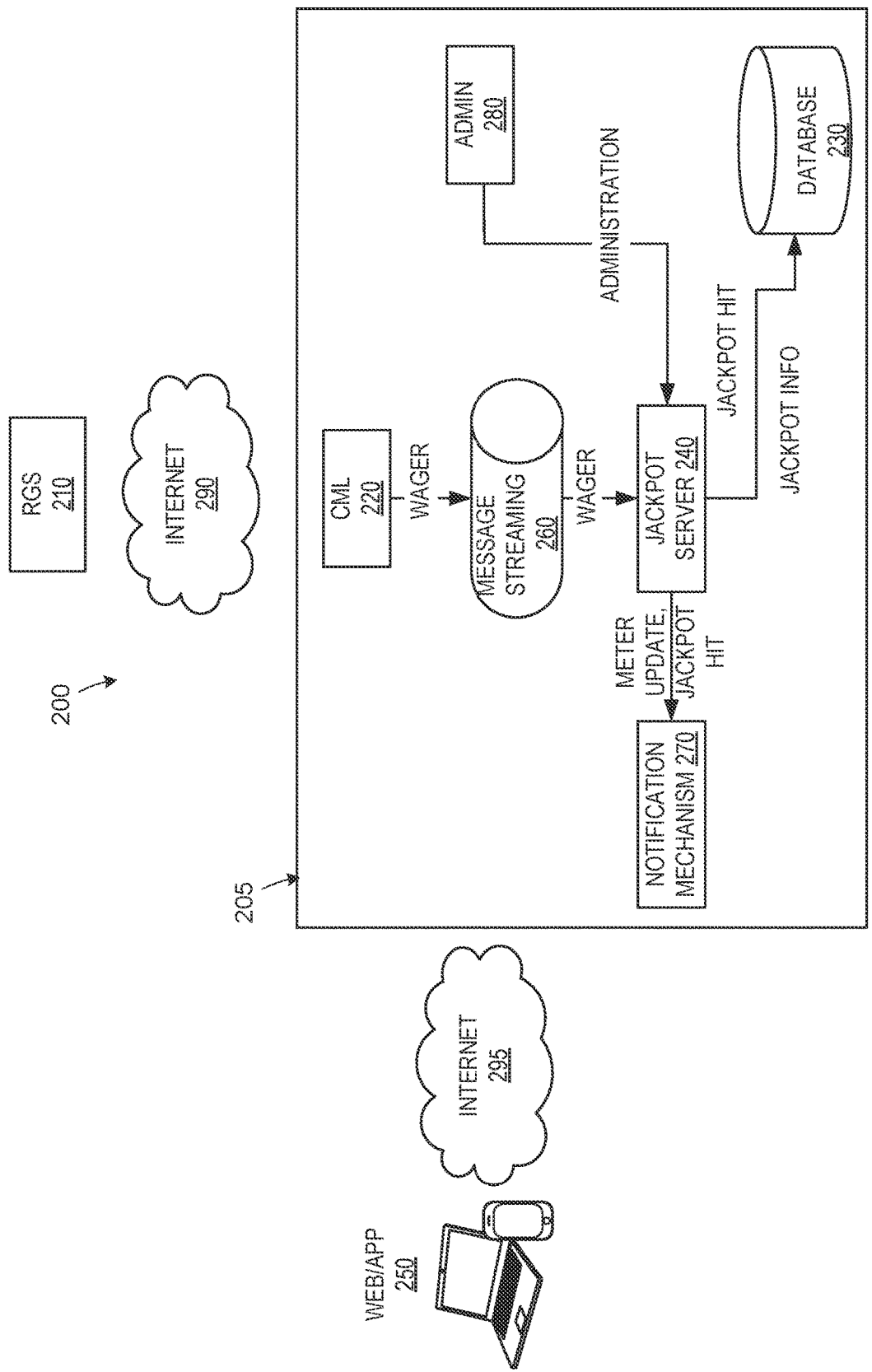
FIG. 2 illustrates an implementation of the example event-driven distributed network architecture of FIG. 1.

FIG. 2 illustrates a particular implementation 200 of the example event-driven distributed network architecture 100 of FIG. 1. As shown in the example of FIG. 2, an RGS 210 and a user device 250 (e.g., a Web page and/or other application running on a computing device such as a smartphone, a laptop, a tablet computer, a desktop computer, a smartwatch, etc.) are in communication with a platform 205 via one or more Internet and/or other network connections 290, 295. A CML 220 provides transaction information such as wager information, etc., from the RGS 210 and/or the user device 250 to a message streaming service 260, which communicates the wager and/or other transaction information to a jackpot server 240. Based on the wager and/or other transaction information, the jackpot server 240 determines whether or not a jackpot hit and/or other event has occurred. In certain examples, an administrator 280 (e.g., a computer program, a human, etc.) can provide content, update, trigger override, and/or other administrative instruction to the jackpot server 240. Jackpot hit and/or other event information can be provided by the jackpot server 240 to a database 230 and to a notification mechanism 270, which communicates with the user device 250 (e.g., to display a notification of jackpot hit and/or other event, etc.). When there is no jackpot hit, a meter update and/or other jackpot/transaction information can be conveyed to the database 230, the notification mechanism 270, etc.

Figure 3:
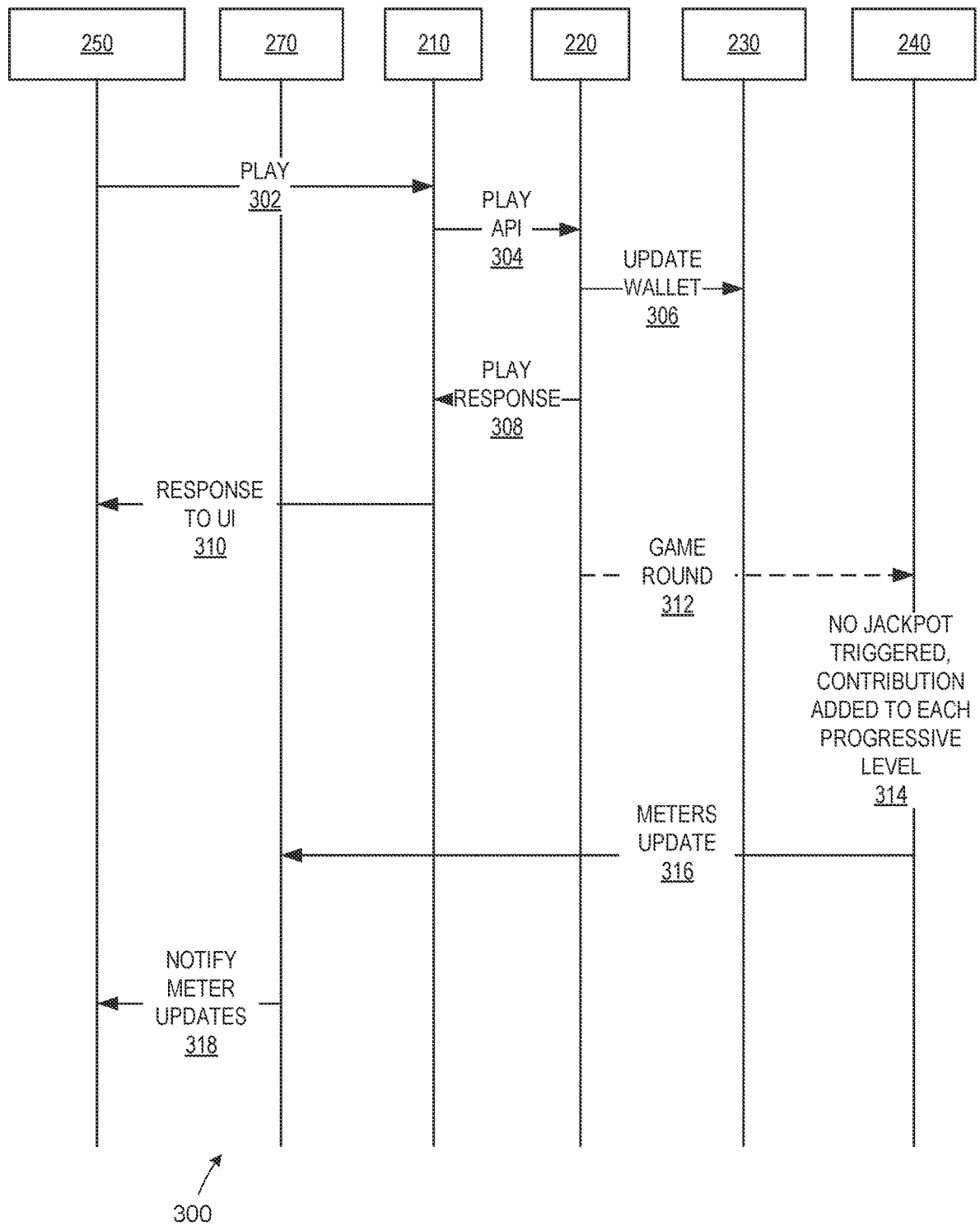
FIGS. 3-6 illustrate example data flows involving the example system of FIG. 2.

FIGS. 3-6 illustrate example data flows involving the example system 200 of FIG. 2. For example, FIG. 3 illustrates an example sequence 300 of actions occurring during normal operation of the example system 200 (e.g., as a standalone progressive, etc.). The example sequence 300 of transactions occurs with routine events and/or other messages (e.g., meter update, game play, etc.) but without a trigger (e.g., win, etc.) event and/or message, such as a jackpot, etc.

As shown in the example of FIG. 3, at 302, the user device 250 initiates play of a game at the RGS 220. At 304, the RGS 220 calls a play application programming interface (API) to update the play transaction with the CML 220. At 306, the CML 220 updates the player account/wallet 230. At 308, the CML 220 triggers a response to the game play from the RGS 210, which, at 310, provides a response to an interface of the user device 250. At 312, the CML 220 updates the jackpot server 240 regarding the game round, and, at 314, the jackpot server 240 updates meters (e.g., a contribution added to each of a plurality of progressive levels, etc.) in response to no trigger event (e.g., no jackpot triggered, etc.). At 316, the jackpot server 240 provides a meter update to the notification mechanism 270, which, at 318, provides meter update(s) to the user device 250.

Figure 4:
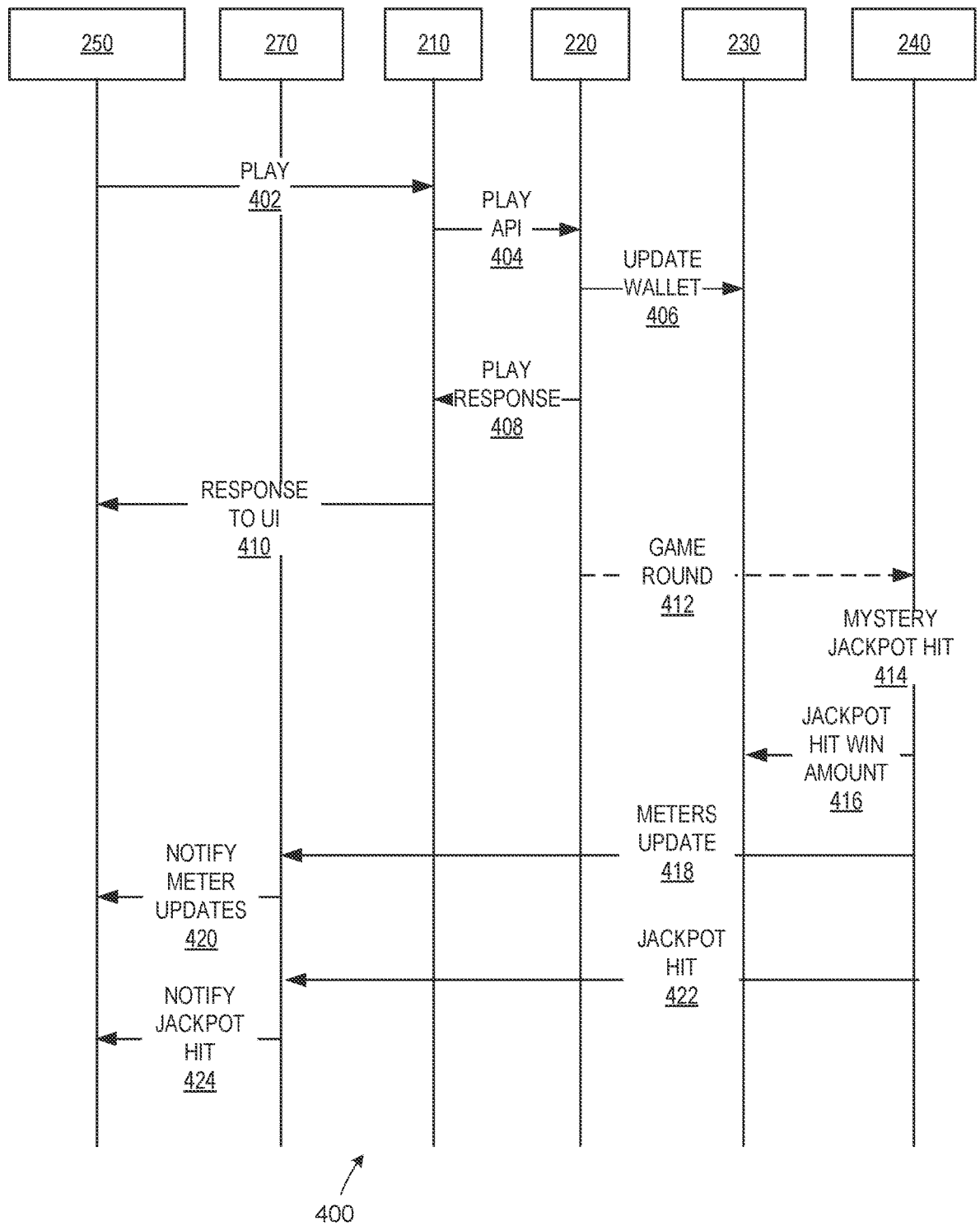

FIG. 4 illustrates an example sequence 400 of actions occurring during normal operation of the example system 200 (e.g., as a standalone progressive, etc.). The example sequence 400 of transactions occurs with routine events and/or other messages (e.g., meter update, game play, etc.) as well as a trigger (e.g., win, etc.) event and/or message, such as a jackpot, etc.

As shown in the example of FIG. 4, at 402, the user device 250 initiates play of a game at the RGS 220. At 404, the RGS 220 calls a play API to update the play transaction with the CML 220. At 406, the CML 220 updates the player account/wallet 230. At 408, the CML 220 triggers a response to the game play from the RGS 210, which, at 410, provides a response to an interface of the user device 250. At 412, the CML 220 updates the jackpot server 240 regarding the game round, and, at 414, the jackpot server 240 determines a trigger event (e.g., a jackpot win, etc.). At 416, the jackpot server 240 provides an amount (e.g., a jackpot win amount, etc.) to the player account/wallet 230. At 418, the jackpot server 240 provides a meter update to the notification mechanism 270, which, at 420, provides meter update(s) to the user device 250. At 422, the jackpot server 240 notifies the notification mechanism 270 of the trigger event (e.g., the jackpot win, etc.). At 424, the notification mechanism 270 notifies the user device 250 of the trigger event (e.g., the jackpot win, etc.).

Figure 5:
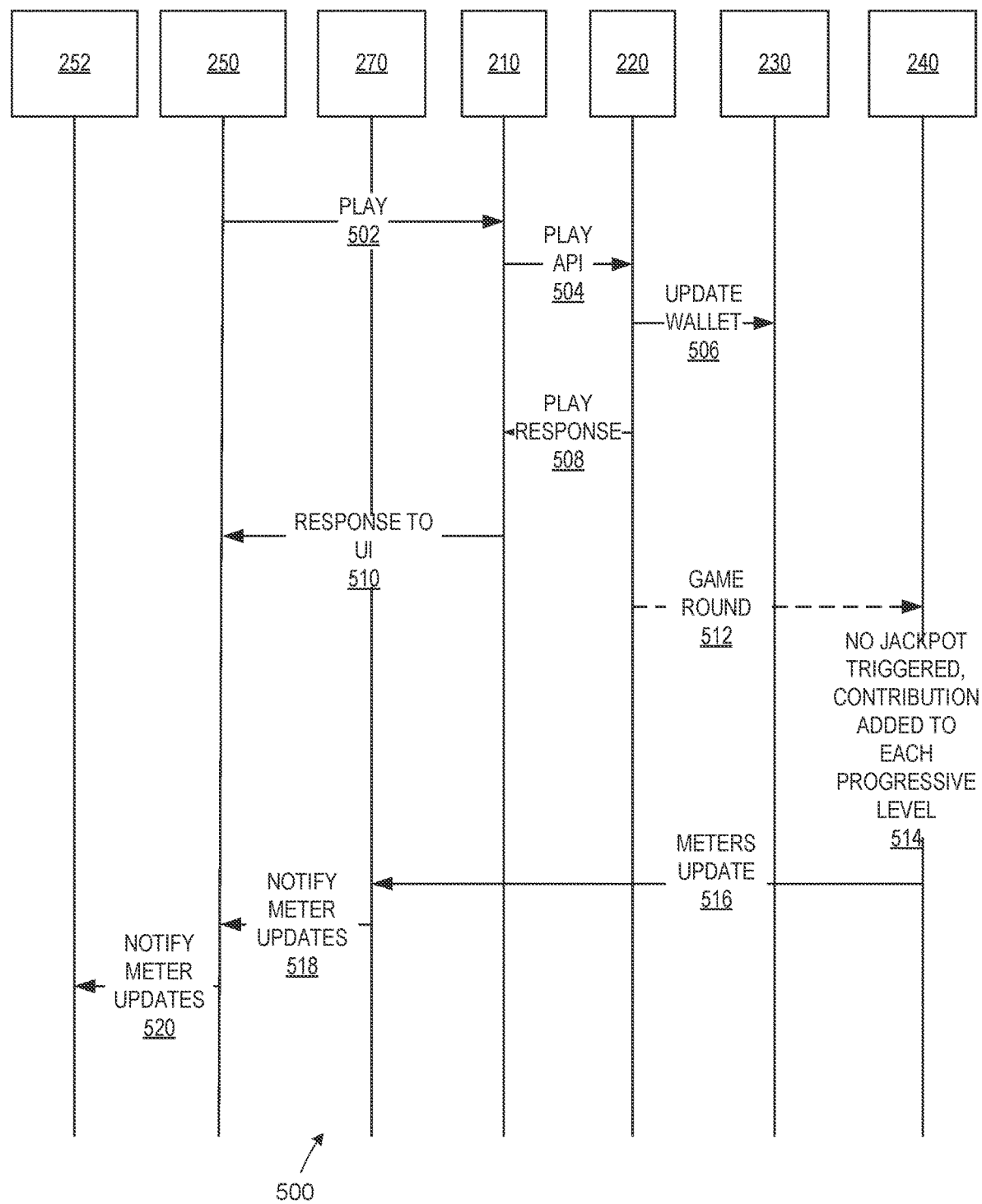

FIG. 5 illustrates an example sequence 500 of actions occurring during normal operation of the example system 200 (e.g., as a linked progressive, etc.). The example sequence 500 of transactions occurs with routine events and/or other messages (e.g., meter update, game play, etc.) but without a trigger (e.g., win, etc.) event and/or message, such as a jackpot, etc.

As shown in the example of FIG. 5, at 502, the first user device 250 initiates play of a game at the RGS 220. At 504, the RGS 220 calls a play API to update the play transaction with the CML 220. At 506, the CML 220 updates the player account/wallet 230. At 508, the CML 220 triggers a response to the game play from the RGS 210, which, at 510, provides a response to an interface of the first user device 250. At 512, the CML 220 updates the jackpot server 240 regarding the game round, and, at 514, the jackpot server 240 updates meters (e.g., a contribution added to each of a plurality of progressive levels, etc.) in response to no trigger event (e.g., no jackpot triggered, etc.). At 516, the jackpot server 240 provides a meter update to the notification mechanism 270, which, at 518, provides meter update(s) to the first user device 250 and, at 520, provides meter update(s) to a second user device 252.

Figure 6:
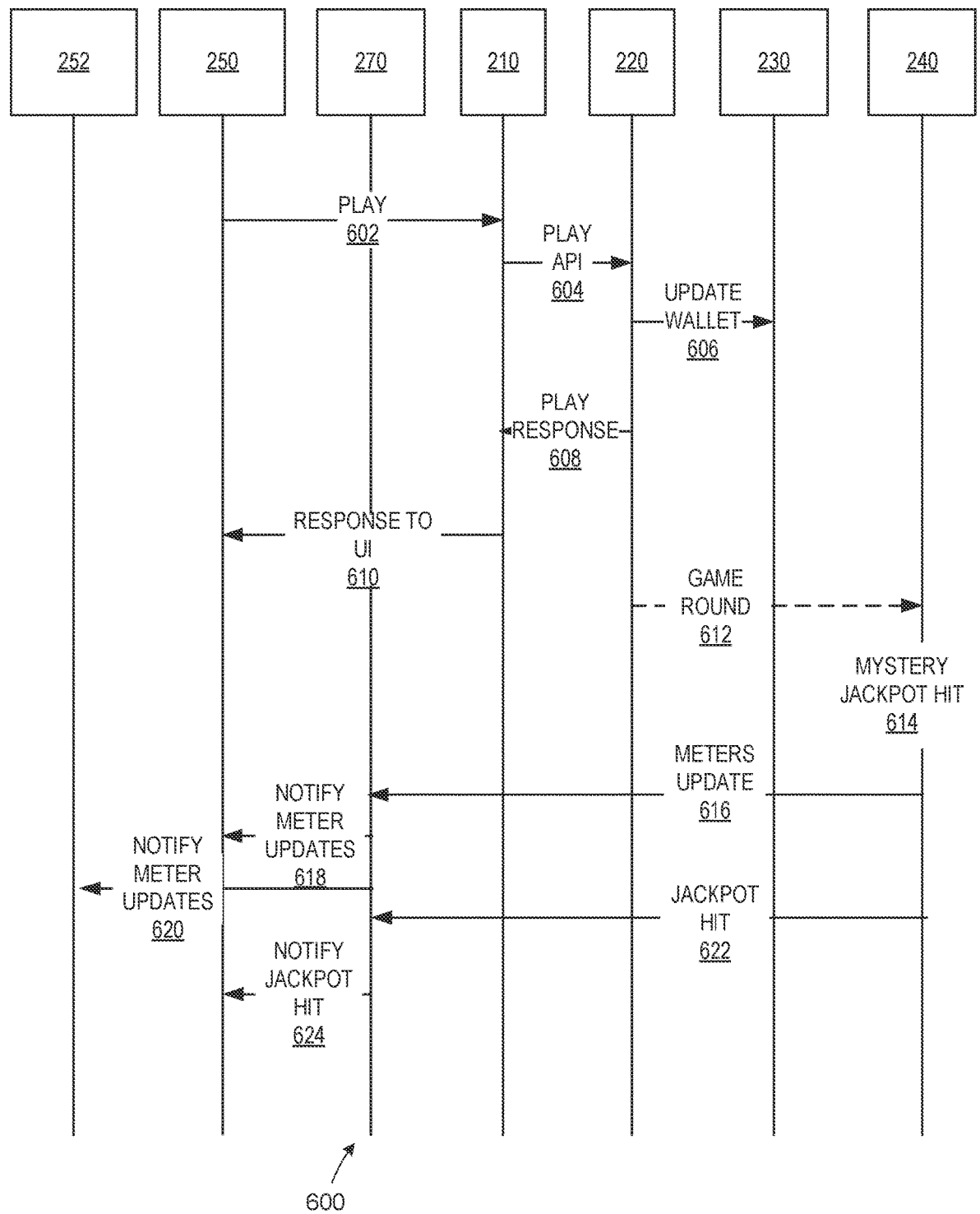

FIG. 6 illustrates an example sequence 600 of actions occurring during normal operation of the example system 200 (e.g., as a linked progressive, etc.). The example sequence 600 of transactions occurs with routine events and/or other messages (e.g., meter update, game play, etc.) and includes a trigger (e.g., win, etc.) event and/or message, such as a jackpot, etc.

As shown in the example of FIG. 6, at 602, the user device 250 initiates play of a game at the RGS 220. At 604, the RGS 220 calls a play API to update the play transaction with the CML 220. At 606, the CML 220 updates the player account/wallet 230. At 608, the CML 220 triggers a response to the game play from the RGS 210, which, at 610, provides a response to an interface of the first user device 250. At 612, the CML 220 updates the jackpot server 240 regarding the game round, and, at 614, the jackpot server 240 determines a trigger event (e.g., a jackpot win, etc.). At 616, the jackpot server 240 provides an amount (e.g., a jackpot win amount, etc.) to the player account/wallet 230. At 618, the jackpot server 240 provides a meter update to the notification mechanism 270, which, at 620, provides meter update(s) to the first user device 250 and, at 622, provides meter update(s) to the second user device 252. At 622, the jackpot server 240 notifies the notification mechanism 270 of the trigger event (e.g., the jackpot win, etc.). At 624, the notification mechanism 270 notifies the first user device 250 of the trigger event (e.g., the jackpot win, etc.).

As such, the particular system 200, and the more general architecture 100, provide a distributed framework facilitating separated transactions which impact various entities on the network 100, 200 in different ways. The example architectures 100, 200 enable certain transactions to affect other transactions in a distributed, event-driven framework. The example architectures 100, 200 provide a distributed but interconnected framework for collective and targeted message processing and event triggering, for example.

Figure 7:
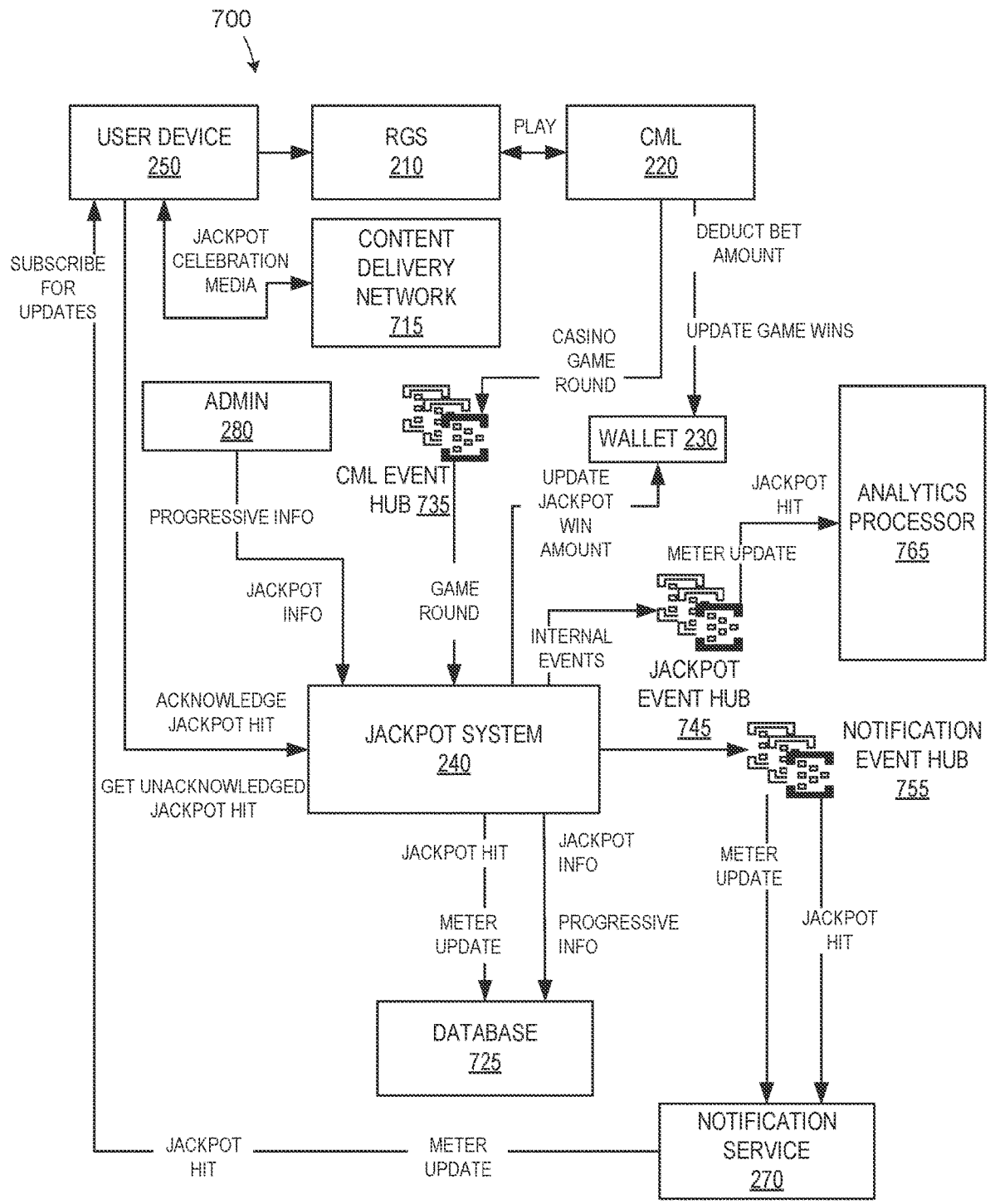
FIG. 7 illustrates an implementation of the example event-driven distributed network architecture of FIG. 2.

FIG. 7 illustrates an implementation 700 of the example event-driven distributed network architecture 200 of FIG. 2. In the example of FIG. 7, an example flow of instructions, events, and other content is represented within the example implementation 700 of the example event-driven distributed network architecture 200 of FIG. 2.

As shown in the example of FIG. 7, the user device 250 includes a user interface (e.g., a browser, an application, etc.) to facilitate play of a game and/or other transaction. The user device 250 communicates with the RGS 210 to facilitate game play and/or other transaction, and the RGS 210 updates the CML 220 regarding the game play/transaction(s). In the example of FIG. 7, a content delivery network 715 can provide content, such as jackpot celebration media, other media content, etc., to the user device 250.

In the example of FIG. 7, the CML 220 receives game play transactions and/or other transactions from the RGS 210. The CML 220 updates the account/wallet 230 based on the received transactions (e.g., an amount bet is deducted, an amount won is added, etc.). The CML 220 also provides one or more events related to the game play and/or other transaction(s) to a CML event hub 735. The jackpot system 240 expects the CML 220 to publish game events and/or other transactions. In the example of FIG. 7, the CML event hub provides such events to the jackpot system 240. The jackpot system 240 can subscribe to the CML event hub 735 to receive one more types of events, for example.

The jackpot system 240 processes events from the event hub 735 to determine jackpot outcome(s). For example, the jackpot system 240 processes events and/or other messages from the CML event hub 735 to determine whether a jackpot hit/win has occurred, etc. The jackpot system 240 can store information such as jackpot hit, meter update, jackpot information, progressive information, etc., in a database and/or other data structure 725.

The jackpot system 240 provides information to a jackpot event hub 745 and a notification event hub 755, for example. The jackpot system 240 provides internal events to the jackpot event hub 745, which provides information such as a meter update, jackpot hit, etc., to an analytics processor 765. The example analytics processor 765 can include one or more artificial intelligence (AI) data models (e.g., convolutional neural network (CNN), other machine learning, other AI, etc.) to analyze the meter and/or jackpot data and provide streaming analytics, a dashboard view of activity, etc. The example notification event hub 755 provides information, such as meter update, jackpot hit, etc., to the notification service 270, which provides the information to the user device 250. In certain examples, the user device 250 subscribes to one or more updates from the notification service 270. The jackpot system 240 uses the notification service 270 to send meter update and/or jackpot hit messages, for example, to a graphical user interface of the user device 250. The user device 250 can communicate with the jackpot system 240 to acknowledge a jackpot hit, provide an unacknowledged jackpot hit, etc.

The jackpot system 240 also updates the account/wallet 230 based on a jackpot win amount to be added to an account, for example. As such, on a jackpot hit/win, the jackpot server 240 updates the wallet 230 with the win amount, for example. In certain examples, the jackpot system 240 is configured and/or adjusted by the administrator 280, which can provide instructions, settings, and/or data to configure the jackpot system 240 regarding jackpot information, progressive information, etc.

Figure 8:
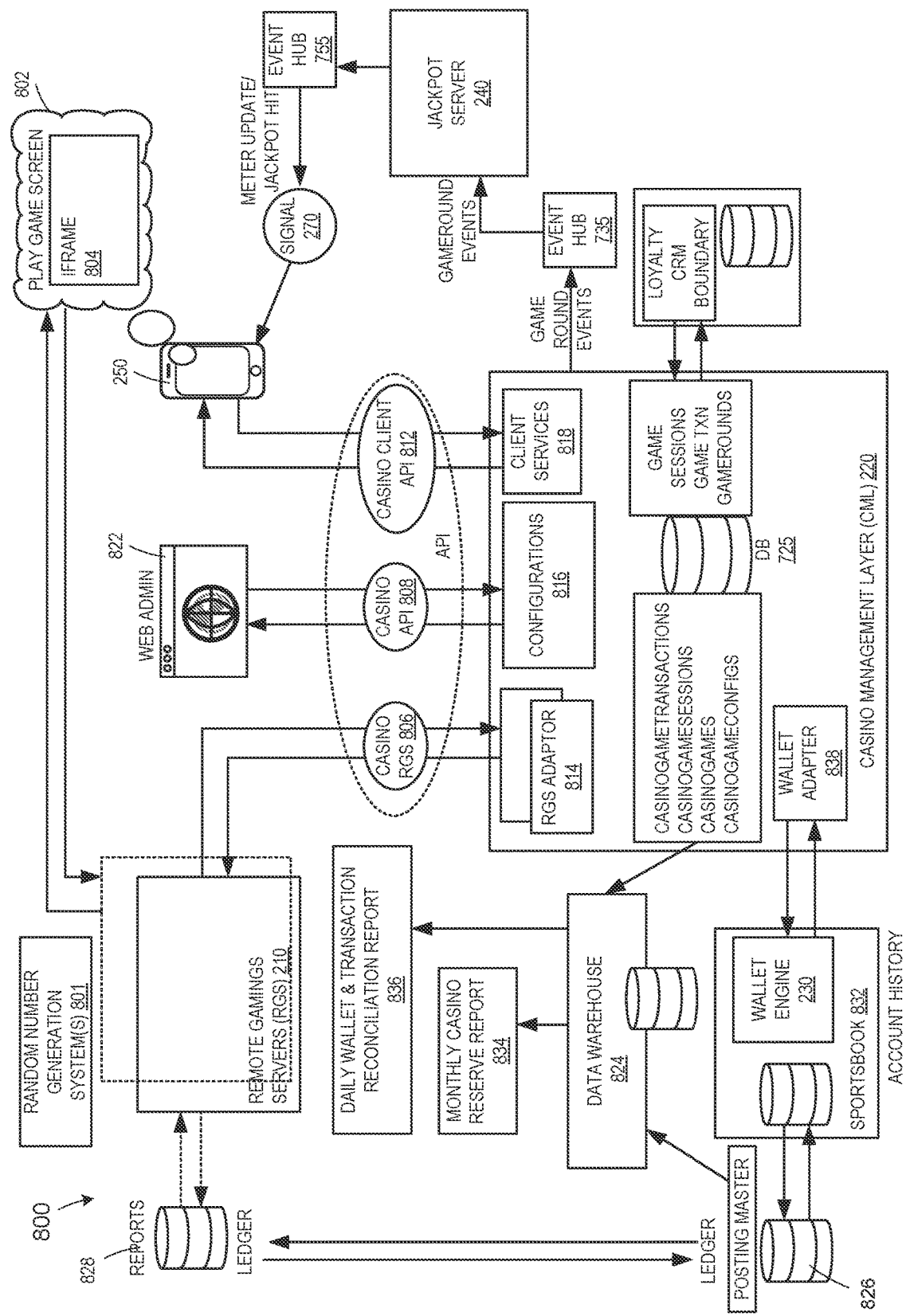
FIG. 8 illustrates an example event-driven network apparatus.

FIG. 8 illustrates an example event-driven network apparatus 800 configured to operate with one or more casinos to drive game play, jackpots, player tracking, and other events. The example network architecture or apparatus 800 can drive play, interaction, and/or other transaction with a user device 250 and one or more RGS 210. The example user device 250 interacts with the one or more RGS 210 via a user interface 802 (e.g., a play game screen, etc.) on which an iframe and/or other window/panel/tab 804 displays content and/or functionality from the RGS 210. The user device 250 and the RGS 210 also interact with the CMS 220, such as via one or more application programming interface (API). One or more random number generator (RNG) systems 801 can help drive game play between the RGS 210 and the user device 250.

As shown in the example of FIG. 8, a casino remote gaming server (RGS) API 806 enables the RGS 210 to interact with the CMS 220. The RGS 210 interacts with one or more RGS adapters 814 via the RGS API 806, for example. An administrator 822 (e.g., a Web-based administrator, etc.) can interact with the CMS 220 via a casino API 808. The administrator 822 interacts with configuration information 816 (e.g., jurisdiction, RGS configuration, other configuration, etc.) via the casino API 808, for example. The user device 250 can interact with the CMS 220 via a casino client API 812. The user device 250 interacts with client services 818 via the client API 812, for example.

As shown in the example of FIG. 8, the CML 220 can include and/or be in communication with a database 725. The example database and/or other data store 725 can include transaction information, such as game transactions, game sessions, game rounds, games, game identification, etc. The database 725 can include one or more copies of the transaction information, and each copy can be associated with a particular source and/or destination, for example. For example, information regarding casino games, casino game transactions, casino game sessions, casino game configurations, etc., can be transferred from the database 725 to a data warehouse 824. The data warehouse 824 stores and conveys transaction information and other posting.

For example, the data warehouse 824 can receive ledger information from a posting master database 826. The posting master database 826 updates a ledger by exchanging game rounds and transaction information with a RGS ledger database 828. The example RGS ledger 828 communicates with one or more RGS 210. The example posting master database 826 also communicates with an account history 832, such as a sportsbook account history page including the player wallet 230 (represented in the example of FIG. 8 as a datastore and a wallet engine), for example. The example data warehouse 824 can generate one or more reports 834-836, such as a monthly casino reserve report, a daily wallet and transaction reconciliation report, etc.

In the example of FIG. 8, the example wallet engine 230 of the account history record 832 can also communicate with the CML 220 via a wallet adapter 838. As such, the player wallet/account can be updated by the CML 220 (e.g., to account for a deducted wager, a jackpot won, other award won, benefit received, etc.) via the wallet adapter 838. The adapter 838 enables different account records 832 (e.g., for different providers, on different platforms/systems, for different jurisdictions/locations, etc.) to communicate with the CML 220, for example.

The example CML 220 also communicates with the jackpot server 240 via the event hub 745. Via the event hub 745, the CML 220 can provide game round events and/or other game transactions, non-game transactions, etc., from the RGS 210, the admin 822, the user device 250, etc., which can drive determination of a jackpot by the jackpot server 240, for example. The example jackpot server 240 communicates with the user device 250 via the event hub 755 and the notification service 270 to provide meter update, jackpot hit, and/or other content to the user device 250. The example user device 250 can display content from the notification service 270 on the screen 802, for example.

While an example implementation of the architecture 100 is illustrated in FIGS. 2-8, one or more of the elements, processes, and/or devices illustrated in FIGS. 2-8 may be combined, divided, re-arranged, omitted, eliminated, and/or implemented in any other way. Further, the example transaction engine 110, the example transaction aggregator 120, the example transaction log 130, the example transaction services 140, the example user device 150, and/or, more generally, the example architecture 100 of FIGS. 1-8, may be implemented by hardware, software, firmware, and/or any combination of hardware, software, and/or firmware. Thus, for example, any of the example transaction engine 110, the example transaction aggregator 120, the example transaction log 130, the example transaction services 140, the example user device 150, and/or, more generally, the example architecture 100 of FIGS. 1-8, can be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example transaction engine 110, the example transaction aggregator 120, the example transaction log 130, the example transaction services 140, and/or the example user device 150 is/are hereby expressly defined to include a non-transitory computer readable storage device or storage disk such as a memory, a digital versatile disk (DVD), a compact disk (CD), a Blu-ray disk, etc., including the software and/or firmware. Further still, the examples of FIGS. 1-8 may include one or more elements, processes, and/or devices in addition to, or instead of, those illustrated in FIGS. 1-8, and/or may include more than one of any or all of the illustrated elements, processes and devices.

Figure 9:
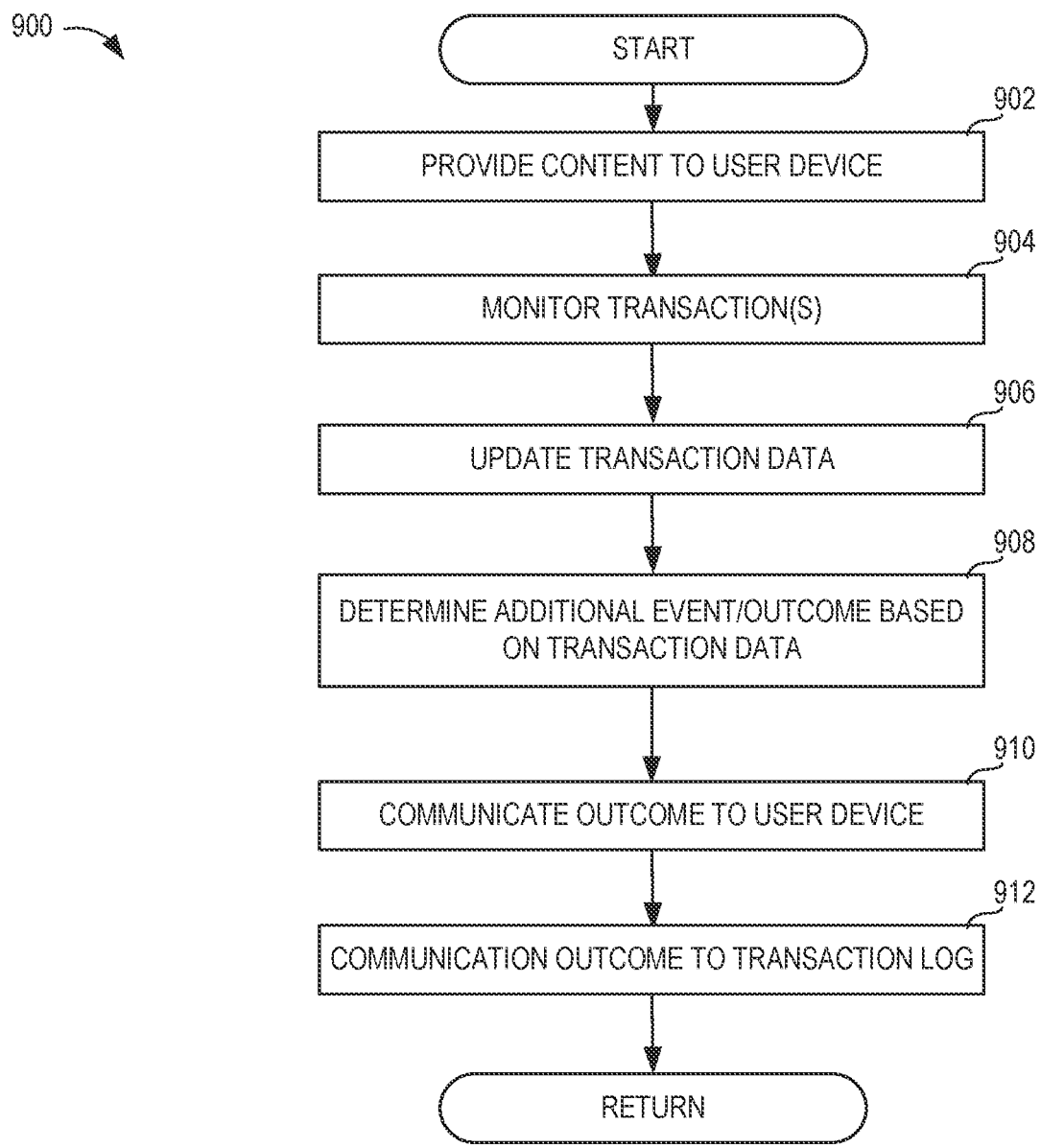
FIGS. 9 and 10 are flowcharts representative of example machine readable instructions that may be executed by example processor circuitry to implement the example architecture of FIGS. 1 and/or 2 and the associated data flow of FIGS. 3-6.
Figure 10:
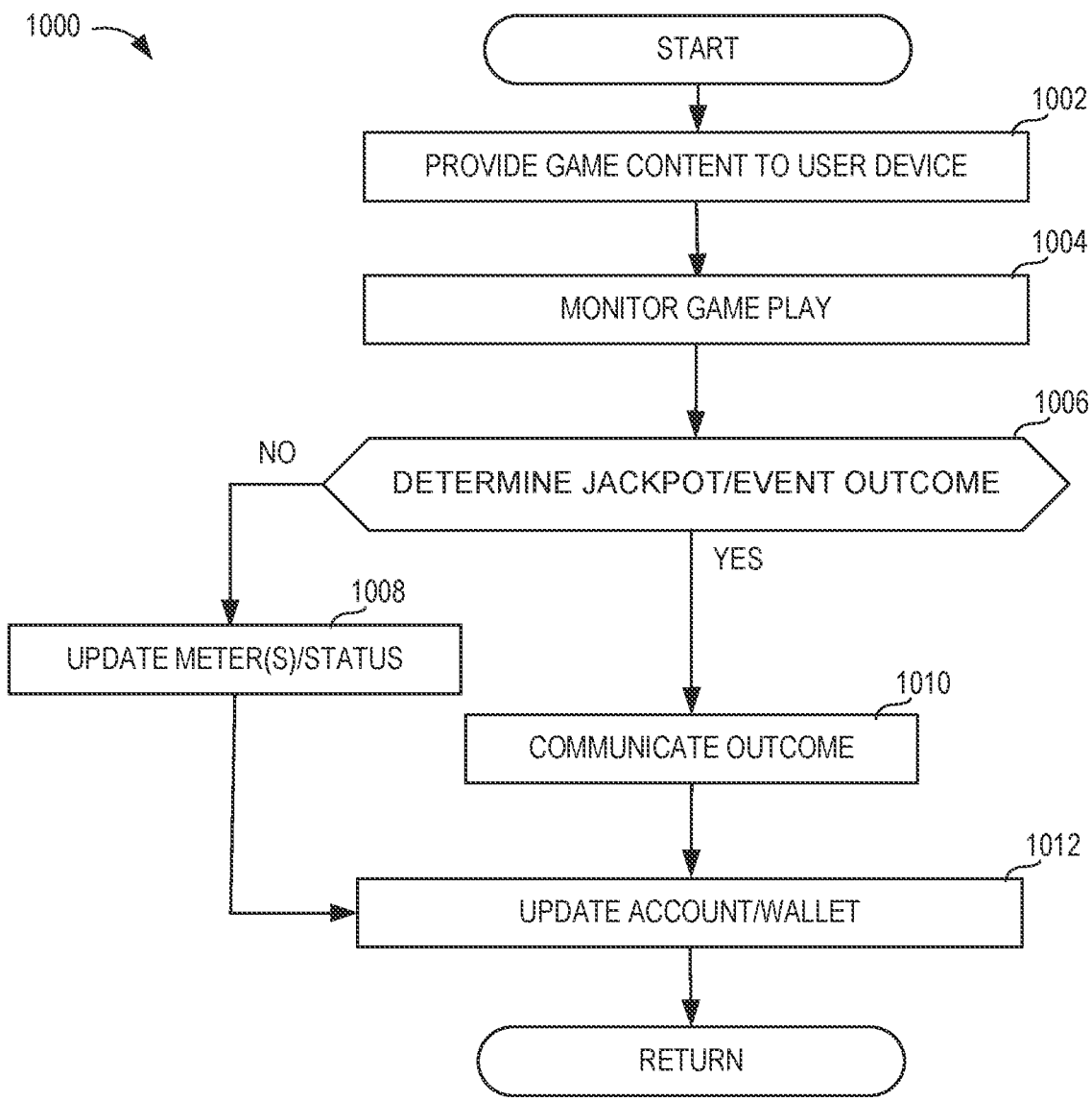

A flowchart representative of example hardware logic circuitry, machine readable instructions, hardware implemented state machines, and/or any combination thereof for implementing the apparatus or architecture 100, 200, 700, 800 of FIGS. 1-8 is shown in FIGS. 9 and 10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 9 and 10, many other methods of implementing the example apparatus 100, 200, 700, and/or 800 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9 and/or 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by processor circuitry to drive interaction between the distributed circuitry of the example network architecture 100 of FIG. 1. The machine readable instructions and/or operations 900 of FIG. 9 begin at block 902, at which content is provided to the user device 150 for display. For example, game content can be provided to the user device 150 for display and interaction to generate one or more transactions, for example. Other content can be provided to the user device 150 to generate transactions. Content can be provided by the transaction server 110, alone or in conjunction with the transaction aggregator 120, transaction services 140, etc.

At block 904, transactions between the user device 150 and the transaction server 110 are monitored. For example, transactions between the user device 150 and the transaction server 110, directly and/or via the transaction aggregator 120, can be monitored. Transactions are monitored to capture transaction data that may drive other transactions and/or events in the system 100.

At block 906, transaction data is updated at the transaction log 130, transaction services 140, RGS 110, etc., via the transaction aggregator 120. The transaction aggregator 120 may work with one or more event hubs and subscription from the RGS 110, transaction log 130, and/or transaction services 140 to store, update, and/or otherwise provide certain transaction data, for example.

At block 908, an additional event outcome is determined for the user device 150 by the transaction services 140 based on the transaction data provided by the transaction aggregator 120. In certain examples, transaction data can also be provided more directly by the RGS 110 and/or the user device 150. Transaction data can be used to update one or more meters, for example, which are then used by the transaction services 140 to determine whether the additional event outcome (e.g., a jackpot, other award, outcome, game, content, etc.) should be triggered for the user device 150.

At block 910, when an additional event or other special outcome is determined for the user device 150, the outcome is communicated to the user device 150 from the transaction services 140. For example, the outcome (e.g., a jackpot hit, etc.) is communicated from the transaction services 140 to the user device 150 via the notification service 270. Communication of the outcome to the user device 150 can trigger a display, reaction, and/or other effect at the user device 150.

At block 912, when the additional event or other special outcome is determined for the user device, the outcome is communicated to the transaction log 130 via the transaction aggregator 120. For example, a monetary aspect of the outcome (e.g., a jackpot win, etc.) updates a value in the transaction log 130, etc.

As such, the event-driven network apparatus 100 can be driven by transactions and other events. The transaction aggregator 120 enables disparate systems, such as the transaction service 110, the transaction services 140, and the user device 150, to communicate and exchange information to drive a variety of outcomes.

FIG. 10 illustrates a particular implementation 1000 of the event-driven network process 900 for the distributed network architecture 200 of the example of FIG. 2. The machine readable instructions and/or operations 1000 of FIG. 10 begin at block 1002, at which game content is provided to the user device 250 for display. For example, the RGS 210 can provide game content to the user device 250 via the CML 220 for display and interaction to generate one or more transactions, for example. Other content can be provided to the user device 250 to generate transactions. Game and/or other content can be provided by one or more RGS 210, alone or in conjunction with the jackpot server 240, via the CML 220, for example.

At block 1004, game play and/or other events are monitored via the CML 220. For example, game play at the user device 250 and/or other activity of the RGS 210, jackpot sever 240, CML 220, etc., can be monitored and used to update one or more meters, etc.

At block 1006, the monitored game play data and/or other events are evaluated to determine a jackpot win and/or other event. For example, one or more meter values, game results, timing information, wager information, and/or other factor, etc., is used by the jackpot services 240 to determine whether a jackpot hit and/or special event/outcome has occurred.

At block 1008, when the jackpot services 240 determine that no jackpot/special event has occurred, one or more meters and/or other status is updated. For example, continued game play, wagering, time, etc., can be updated by the jackpot services 240 and stored, conveyed back to the user device 250, provided to the CML 220, etc.

At block 1010, when the jackpot services 240 determines that a jackpot hit and/or other special event/outcome has occurred, the outcome is communicated to the user device 250. For example, the jackpot services 240 notifies the user device 250 of a jackpot win and can provide the user device 250 with a visualization and/or other output to display the result via the user device 250. In some examples, jackpot content can be provided to the user device 250 from a separate content network, etc. Communication of the outcome to the user device 250 can trigger a display, reaction, and/or other effect at the user device 250, for example.

At block 1012, the account/wallet 230 is updated. For example, meter values can be updated with the account or wallet 230, credit and/or other award from a jackpot hit can be added to the wallet 230, wagers can be deducted from the wallet 230, etc.

As such, the event-driven network apparatus 100 can be driven by transactions and other events occurring within game play on a user device 250. The CML 220 enables disparate systems, such as the RGS 210, the jackpot services 240, and the user device 250, to communicate and exchange information to drive a variety of outcomes.

Figure 11:
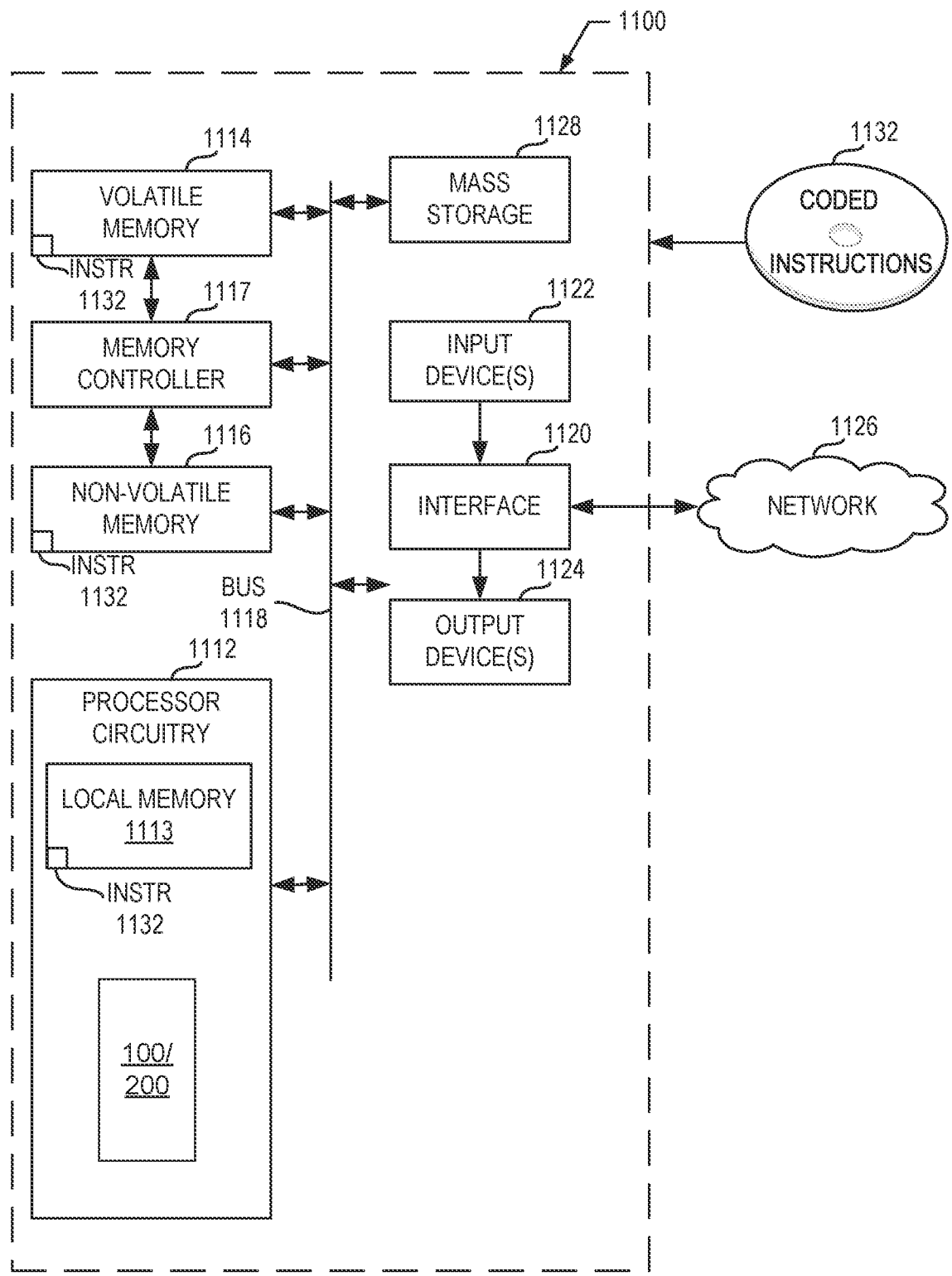
FIG. 11 is a block diagram of an example processing platform including processor circuitry structured to execute the example machine readable instructions of FIGS. 9 and/or 10 to implement the example architecture of FIGS. 1 and/or 2 and the associated data flow of FIGS. 3-6.

FIG. 11 is a block diagram of an example processor platform 1100 structured to execute and/or instantiate the machine readable instructions and/or operations of FIGS. 9-10 to implement the apparatus of FIGS. 1, 2, 7, and/or 8. The processor platform 1100 can be, for example, a server, a personal computer, a workstation, a self-learning machine (e.g., a neural network), a mobile device (e.g., a cell phone, a smart phone, a tablet such as an iPad™, etc.), a personal digital assistant (PDA), an Internet appliance, a gaming console, an electronic gaming machine, a casino management system, or other computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example circuitry 100 and/or 200.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIGS. 9-10, may be stored in the mass storage device 1128, in the volatile memory 1114, in the non-volatile memory 1116, and/or on a removable non-transitory computer readable storage medium such as a CD or DVD.

Figure 12:
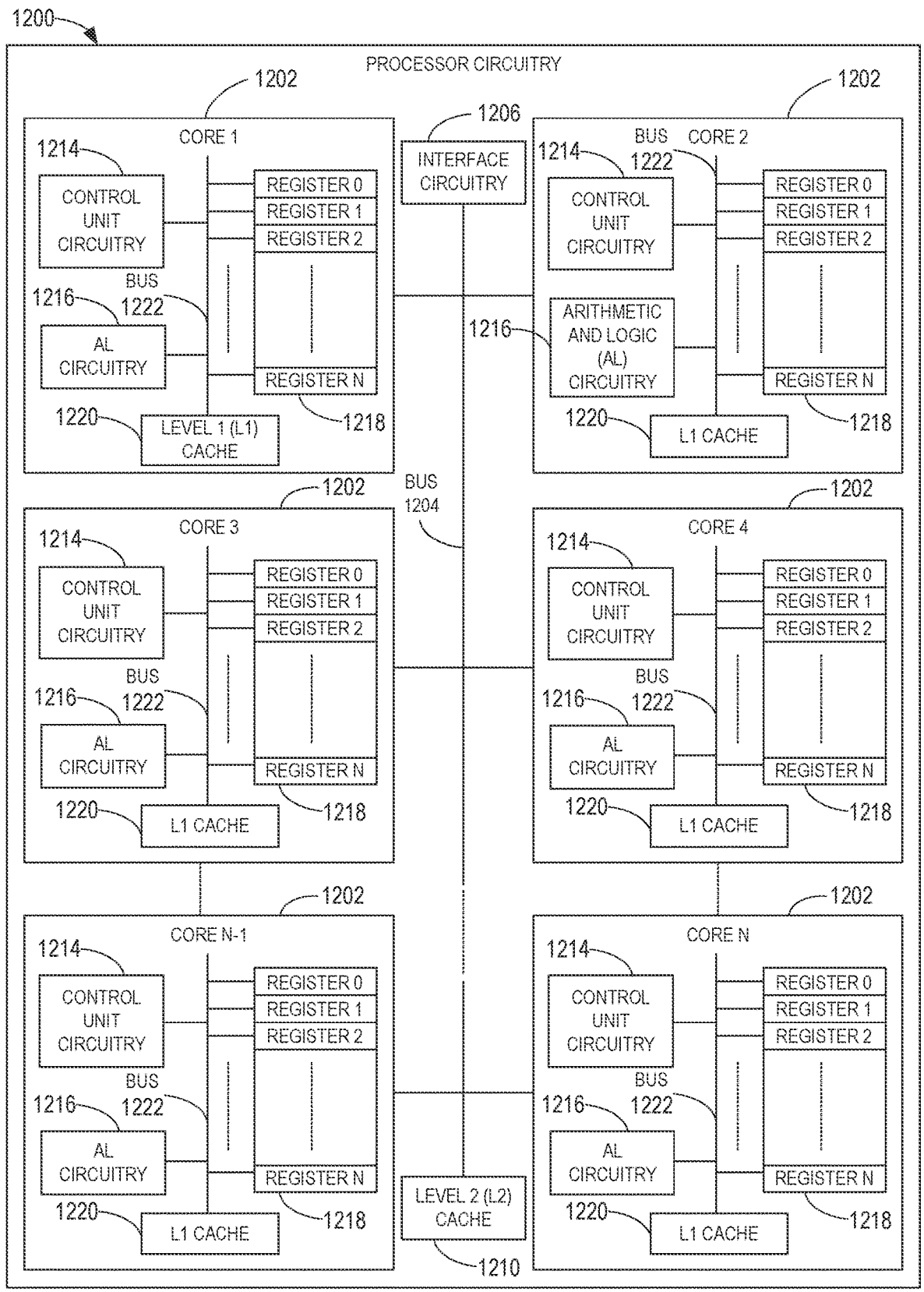
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 700 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 9-10.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1220 may implement at least one of an I2C bus, a SPI bus, a PCI bus, or a PCIe bus.

Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
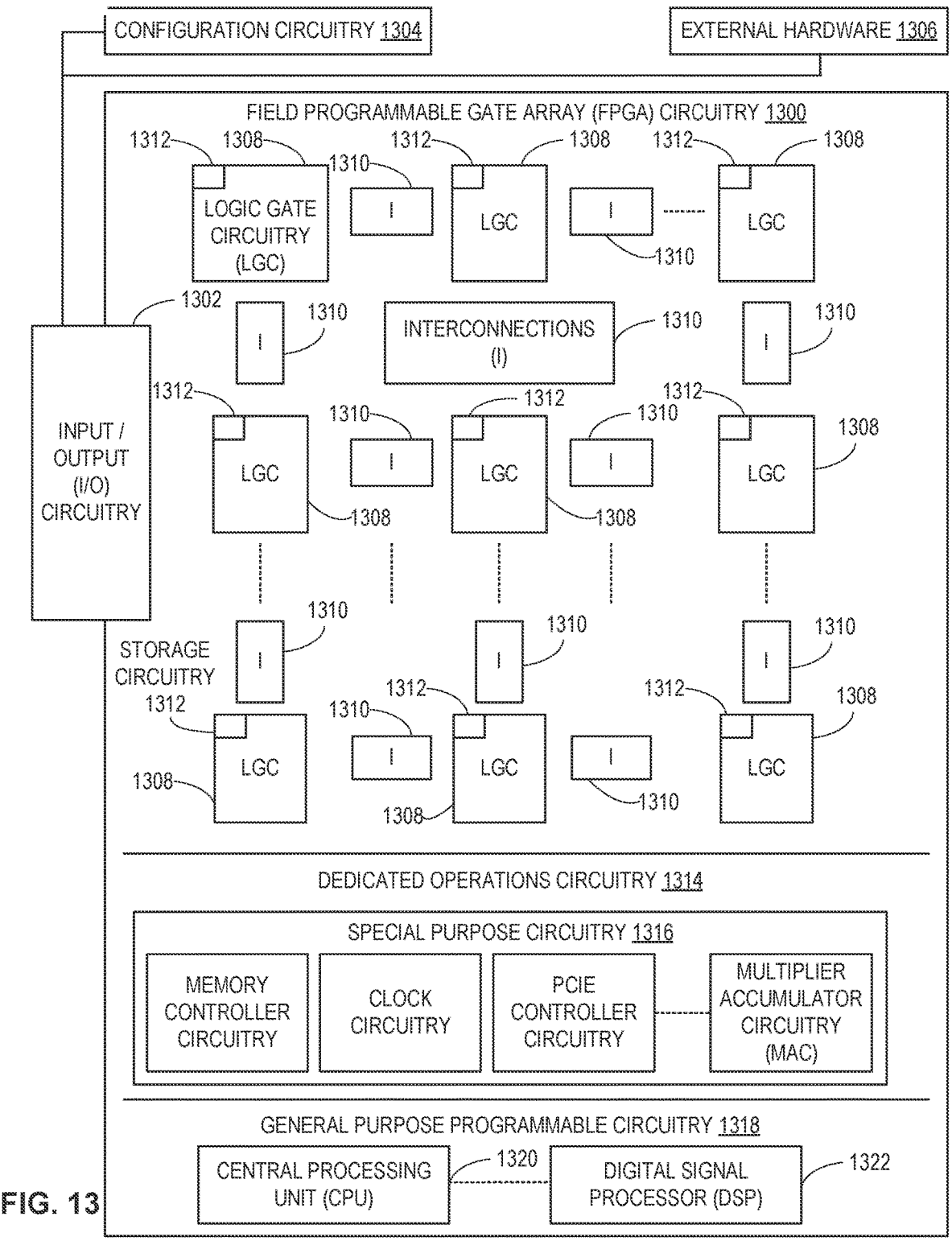
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 9-10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 9-10. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 9-10. As such, the FPGA circuitry 1300 may be structured to effectively instantiate some or all of the machine readable instructions of the flowcharts of FIGS. 9-10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 9-10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIGS. 9-10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 9-10 may be executed by one or more of the cores 1202 of FIG. 12 and a second portion of the machine readable instructions represented by the flowcharts of FIGS. 9-10 may be executed by the FPGA circuitry 1300 of FIG. 13.

In some examples, the processor circuitry 1112 of FIG. 11 may be in one or more packages. For example, the processor circuitry 1200 of FIG. 12 and/or the FPGA circuitry 1200 of FIG. 12 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
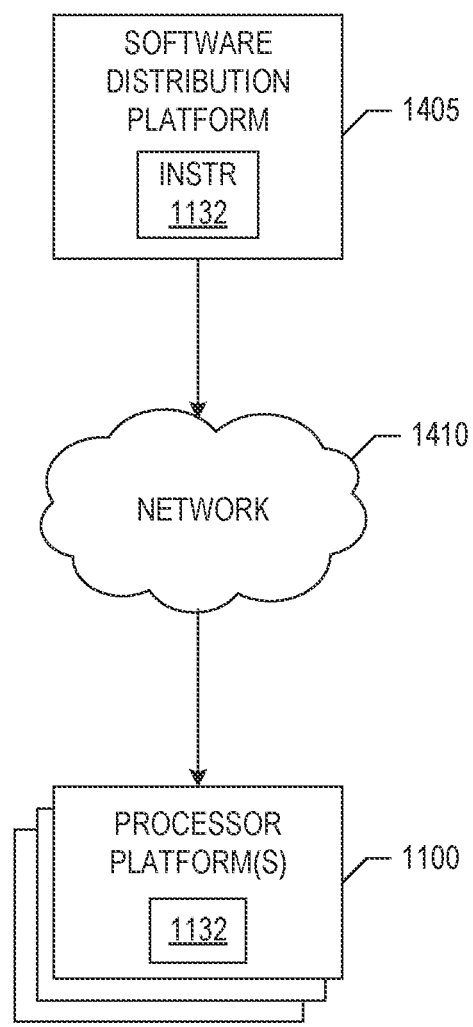
FIG. 14 is a block diagram of an example software distribution platform (e.g., one or more servers) to distribute software (e.g., software corresponding to the example machine readable instructions of FIGS. 9-10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 1132, which may correspond to the example machine readable instructions 900, 1000 of FIGS. 9-10, as described above. The one or more servers of the example software distribution platform 1405 are in communication with a network 1410, which may correspond to any one or more of the Internet and/or any of the example networks 1126 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 900, 1000 of FIGS. 9-10 may be downloaded to the example processor platform 1100, which is to execute the machine readable instructions 1132 to implement the example architecture 100 and/or 200 (and/or 700, 800, etc.). In some examples, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

In some examples, the software distribution platform 1405 and/or the processor platform 1100 can be implemented as one or more cloud-based platform. As such, one or more of the transaction engine 110, transaction aggregator 120, transaction log 130, transaction services 140, etc., can be implemented as a cloud-based system. Similarly, one or more of the RGS 110, the CML 220, the jackpot server 240, and/or the platform 205 in its entirety, can be implemented as a cloud-based system.

From the foregoing, it will be appreciated that example systems, methods, apparatus, and articles of manufacture have been disclosed that manages regional risk and transforms a data stream into different data sets with disparate impact on disparate regional systems. The disclosed systems, methods, apparatus, and articles of manufacture improve the efficiency of using a computing device to ensure up-to-date information and opportunities across disparate systems via a transaction aggregator. The disclosed systems, methods, apparatus, and articles of manufacture are accordingly directed to one or more improvement(s) in the operation of a machine such as a computer or other electronic and/or mechanical device. Certain examples provide a dynamic, updating, event-driven architecture that remedies many deficiencies in prior systems through the aggregator, event hubs, and disparate services and servers communicating together directly as well as via the aggregator.

These elements described herein as part of the presently disclosed technology could not be implemented or performed before the internet or computer technology, nor can these elements be implemented or performed using only mental processes. None of the structures, functions, and/or features provided by the novel architecture are well-understood, routine or conventional.

Further aspects of the present disclosure are provided by the subject matter of the following clauses:

Example 1 is an apparatus including: a transaction aggregator to monitor transactions with respect to a user device and a transaction engine regarding content provided to the user device; and transaction services to process the transactions from the transaction aggregator to at least: determine occurrence of an event with respect to the user device based on an evaluation of the transactions; when the event is determined to occur, trigger a notification of the event to the user device; and update a record based on the processing of the transactions.

Example 2 includes the apparatus of any preceding clause, wherein the transaction services is to update the record by updating a meter.

Example 3 includes the apparatus of any preceding clause, wherein the transaction services is to update the record by updating an account based on the event.

Example 4 includes the apparatus of any preceding clause, further including a transaction log, the transaction log to be updated by the transaction aggregator and the transaction services based on the transactions.

Example 5 includes the apparatus of any preceding clause, wherein the event includes a jackpot hit.

Example 6 includes the apparatus of any preceding clause, wherein the transaction engine includes a remote gaming server.

Example 7 includes the apparatus of any preceding clause, wherein the transaction services include a jackpot server.

Example 8 includes the apparatus of any preceding clause, wherein the transaction aggregator includes a management layer.

Example 9 includes the apparatus of any preceding clause, further including one or more event hubs to manage subscription notifications regarding one or more types of transactions.

Example 10 includes the apparatus of any preceding clause, further including a messaging service to communicate between the transaction services and the user device.

Example 11 is an apparatus including: memory circuitry; instructions; and processor circuitry to at least: monitor and aggregate transactions with respect to a user device and a transaction engine regarding content provided to the user device; determine occurrence of an event with respect to the user device based on an evaluation of the transactions; when the event is determined to occur, trigger a notification of the event to the user device; and update a record based on the processing of the transactions.

Example 12 includes the apparatus of any preceding clause, wherein the instructions, when executed, cause the processor circuitry to update a transaction log in the memory circuitry based on at least one of the record or the transactions.

Example 13 includes the apparatus of any preceding clause, wherein the event includes a jackpot hit, the jackpot hit determined based on the transactions by jackpot services, and wherein the instructions, when executed, cause the processor circuitry to display an outcome of the jackpot hit on a user interface of the user device.

Example 14 includes the apparatus of any preceding clause, wherein the instructions, when executed, cause the processor circuitry to manage one or more subscriptions to one or more types of transactions via one or more event hubs.

Example 15 includes the apparatus of any preceding clause, wherein the transaction engine includes a remote gaming server, wherein the content includes a game, and wherein the instructions, when executed, cause the processor circuitry to monitor and aggregate game play as the transactions.

Example 16 is at least one computer readable storage medium comprising instructions that, when executed, cause processor circuitry to at least: monitor and aggregate transactions with respect to a user device and a transaction engine regarding content provided to the user device; determine occurrence of an event with respect to the user device based on an evaluation of the transactions; when the event is determined to occur, trigger a notification of the event to the user device; and update a record based on the processing of the transactions.

Example 17 includes the at least one computer readable storage medium of any preceding clause, wherein the instructions, when executed, cause the processor circuitry to update a transaction log based on at least one of the record or the transactions.

Example 18 includes the at least one computer readable storage medium of any preceding clause, wherein the event includes a jackpot hit, the jackpot hit determined based on the transactions by jackpot services, and wherein the instructions, when executed, cause the processor circuitry to display an outcome of the jackpot hit on a user interface of the user device.

Example 19 includes the at least one computer readable storage medium of any preceding clause, wherein the instructions, when executed, cause the processor circuitry to manage one or more subscriptions to one or more types of transactions via one or more event hubs.

Example 20 includes the at least one computer readable storage medium of any preceding clause, wherein the transaction engine includes a remote gaming server, wherein the content includes a game, and wherein the instructions, when executed, cause the processor circuitry to monitor and aggregate game play as the transactions.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a transaction aggregator providing an event hub and a management layer to monitor transactions between a user device and a transaction engine regarding content provided to the user device, the user device separate from the transaction aggregator and the transaction engine, the transaction engine providing gaming content to the user device, the transactions involving game content and account activity; and
transaction services providing a jackpot server to, triggered by a first subscription of the jackpot server to the event hub and a second subscription of the user device to a notification service, process the transactions from the transaction aggregator to, overlapping with but separate from game play interaction between the transaction engine and the user device, at least:
determine occurrence of an event outcome impacting the user device based on an evaluation of the received transactions from the management layer and events from the event hub of the transaction aggregator;
when the event outcome is determined to occur, trigger a notification via the notification service of the event outcome to the user device, the notification driving a visual effect at the user device and an update of a player account associated with the user device; and
update a record associated with the transaction engine based on the processing of the transactions.

2. The apparatus of claim 1, wherein the transaction services is to update the record by updating a meter.

3. The apparatus of claim 1, wherein the transaction services is to update the record by updating an account based on the event.

4. The apparatus of claim 1, further including a transaction log, the transaction log to be updated by the transaction aggregator and the transaction services based on the transactions.

5. The apparatus of claim 1, wherein the event outcome includes a jackpot hit.

6. The apparatus of claim 1, wherein the transaction engine includes a remote gaming server.

7. The apparatus of claim 1, wherein the event hub includes a plurality of event hubs to manage subscription notifications regarding a plurality of types of transactions.

8. The apparatus of claim 1, wherein the notification service includes a messaging service to communicate between the transaction services and the user device.

9. An apparatus comprising:
memory circuitry;
instructions; and
processor circuitry to at least:
monitor and aggregate transactions between a user device and a transaction engine regarding content provided to the user device, the transactions provided by a management layer of a transaction aggregator, the user device separate from the transaction aggregator and the transaction engine, the transaction engine providing gaming content to the user device, the transactions involving game content and account activity;
determine occurrence of an event outcome impacting the user device based on an evaluation of the transactions from the management layer and events from an event hub;
when the event outcome is determined to occur, trigger a notification of the event outcome, via a notification service, to the user device, the notification driving a visual effect at the user device and an update of a player account associated with the user device; and
update a record associated with the transaction engine based on the processing of the transactions.

10. The apparatus of claim 9, wherein the instructions, when executed, cause the processor circuitry to update a transaction log in the memory circuitry based on at least one of the record or the transactions.

11. The apparatus of claim 9, wherein the event outcome includes a jackpot hit, the jackpot hit determined based on the transactions by jackpot services, and wherein the instructions, when executed, cause the processor circuitry to display an outcome of the jackpot hit on a user interface of the user device.

12. The apparatus of claim 9, wherein the instructions, when executed, cause the processor circuitry to manage one or more subscriptions to one or more types of transactions via one or more event hubs.

13. The apparatus of claim 9, wherein the transaction engine includes a remote gaming server, wherein the content includes a game, and wherein the instructions, when executed, cause the processor circuitry to monitor and aggregate game play as the transactions.

14. At least one computer readable storage medium comprising instructions that, when executed, cause processor circuitry to at least:
monitor and aggregate transactions between a user device and a transaction engine regarding content provided to the user device, the transactions provided by a management layer of a transaction aggregator, the user device separate from the transaction aggregator and the transaction engine, the transaction engine providing gaming content to the user device, the transactions involving game content and account activity;

determine occurrence of an event outcome impacting the user device based on an evaluation of the transactions from the management layer and events from an event hub;

when the event outcome is determined to occur, trigger a notification of the event outcome, via a notification service, to the user device, the notification driving a visual effect at the user device and an update of a player account associated with the user device; and update a record associated with the transaction engine based on the processing of the transactions.

15. The at least one computer readable storage medium of claim 14, wherein the instructions, when executed, cause the processor circuitry to update a transaction log based on at least one of the record or the transactions.

16. The at least one computer readable storage medium of claim 14, wherein the event outcome includes a jackpot hit, the jackpot hit determined based on the transactions by jackpot services, and wherein the instructions, when executed, cause the processor circuitry to display an outcome of the jackpot hit on a user interface of the user device.

17. The at least one computer readable storage medium of claim 14, wherein the instructions, when executed, cause the processor circuitry to manage one or more subscriptions to one or more types of transactions via one or more event hubs.

18. The at least one computer readable storage medium of claim 14, wherein the transaction engine includes a remote gaming server, wherein the content includes a game, and wherein the instructions, when executed, cause the processor circuitry to monitor and aggregate game play as the transactions.

* * * * *